United States Patent
Cooper et al.

(10) Patent No.: US 6,934,544 B2
(45) Date of Patent: Aug. 23, 2005

(54) METHOD AND APPARATUS FOR CONFIGURABLE SELECTION AND ACQUISITION OF A WIRELESS COMMUNICATIONS SYSTEM

(75) Inventors: Rotem Cooper, San Diego, CA (US); Yugandhar Chiniga, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 410 days.

(21) Appl. No.: 10/138,991

(22) Filed: May 2, 2002

(65) Prior Publication Data

US 2003/0148786 A1 Aug. 7, 2003

Related U.S. Application Data

(60) Provisional application No. 60/354,424, filed on Feb. 4, 2002.

(51) Int. Cl.⁷ .................................................. H04Q 7/20
(52) U.S. Cl. .................................. 455/435.2; 455/552.1
(58) Field of Search ............................. 455/434, 435.2, 455/455, 551, 552.1, 553.1, 62, 161.1, 168.1, 550.1

(56) References Cited

U.S. PATENT DOCUMENTS

| | | | |
|---|---|---|---|
| 5,442,806 A | * | 8/1995 | Barber et al. ............ 455/435.2 |
| 5,504,803 A | * | 4/1996 | Yamada et al. ............. 455/434 |
| 5,517,677 A | * | 5/1996 | Moon ....................... 455/161.1 |
| 5,832,367 A | * | 11/1998 | Bamburak et al. ............ 455/62 |
| 6,324,400 B1 | | 11/2001 | Shah et al. ................. 455/434 |

FOREIGN PATENT DOCUMENTS

| | | |
|---|---|---|
| EP | 0779754 | 12/1996 |
| WO | 0139532 | 11/2000 |
| WO | 0147316 | 12/2000 |

* cited by examiner

*Primary Examiner*—Quochien B. Vuong
(74) *Attorney, Agent, or Firm*—Philip Wadsworth; Bruce W. Greenhaus; Richard A. Bachand

(57) ABSTRACT

A mobile station includes client circuitry for facilitating wireless communications with a wireless communications system, and a configurable system selection unit that executes a system selection and acquisition procedure. The configurable system selection unit includes a front end and a system selection core. The front end facilitates communications between the configurable system selection unit and the client circuitry. The system selection core is coupled to the front end and includes a script engine and a nonvolatile memory storing at least one script table. The script table includes a plurality of system selection event conditions and corresponding scripts that define a system selection and acquisition procedure. The script engine is adapted to detect an event condition and execute the corresponding script. The system selection core is adapted to receive a system selection script and store the received script in the script table, thereby altering the system selection and acquisition procedure.

7 Claims, 6 Drawing Sheets

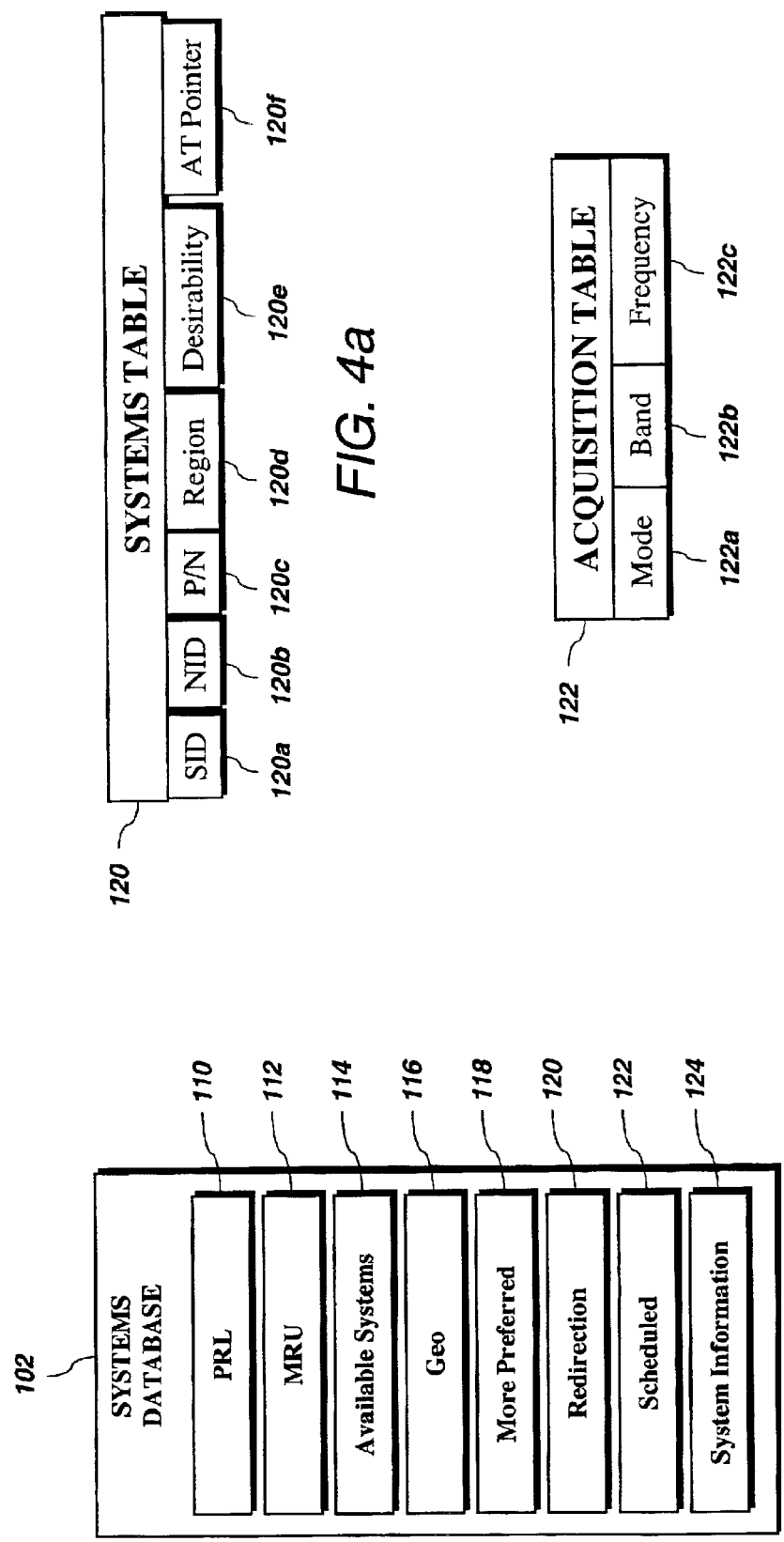

METHOD AND APPARATUS FOR CONFIGURABLE SELECTION AND ACQUISITION OF A WIRELESS COMMUNICATIONS SYSTEM

RELATED APPLICATIONS

This application claims priority to U.S. Provisional Application No. 60/354,424, filed on Feb. 4, 2002.

BACKGROUND OF THE INVENTION

1. Field of the Invention

The present invention relates generally to wireless communications and, in particular, to a method and apparatus for configurable selection and acquisition of a wireless communications system.

2. Description of the Related Art

A mobile device will often have access to more than one wireless communications system in its geographic region. The quality of the wireless services available to the mobile device may vary from system to system depending on the equipment used by each system, the features of the mobile device, the distance between the mobile device and local base stations, physical obstructions such as buildings and hills, and the volume of communications traffic on each system. The local wireless communications systems may also support different multiple-access wireless communications protocols such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). In addition, the fees charged to a user of the mobile device may vary depending on the time of day, the duration of the connection with the wireless communications system and whether the mobile device is listed as a subscriber of the wireless communications system.

In operation, a conventional mobile device selects and attempts to acquire and register with at least one of the available wireless communications systems. To assist with the selection of a desirable system, the mobile device typically stores systems data that identifies the wireless communications systems that are compatible with the mobile device. In one approach, the systems data is a preferred roaming list (PRL) that includes a systems table, which stores a system identifier (SID) and a network identifier (NID) for each wireless communications system, and an acquisition table, which stores acquisition parameters including band, frequency and mode for the systems listed in the systems table.

Within the systems table, the wireless communications systems are often grouped by geographic region and sorted from the most desirable to the least desirable system in each region. The most desirable system in a particular geographic region is typically a subscriber system, but may also be a roaming system that offers the mobile device a favorable combination of low cost and high quality of service. Roaming systems offer wireless services to non-subscriber mobile devices, usually at a much higher fee than subscription services, and may be desirable when the mobile device enters a geographic region that is outside the coverage area of the mobile device's subscription service, when the subscription services are blocked or otherwise unavailable, or when the subscription services are only available at an unacceptably low level of quality. The systems table is typically maintained by the mobile device's wireless services provider through periodic downloads of updated systems data. By controlling the content of the systems table, the mobile device's wireless services provider may establish an order of priority among the listed systems that steers the system selection process towards its own systems and its partner's systems.

A conventional mobile device also includes system selection logic that defines a system selection and acquisition procedure. The system selection and acquisition procedure dictates how and when systems are selected from the systems table, which systems should be given priority, which systems should be avoided, the types of data that should be maintained for each system and other criteria that impacts the system selection order. In a common system selection and acquisition procedure, the mobile device first steps through a list of the systems that were most recently used by the mobile device, attempting to acquire and register with each system until a system acquisition and registration attempt is successful. If these systems are exhausted without a successful system acquisition, the mobile device attempts to acquire and register with one of the systems listed in the systems table, starting with the most desirable system in the current geographic region and working through to the least desirable system in the current geographic region. If these acquisition attempts are unsuccessful, the mobile device scans available frequencies in an exhaustive search for a local system.

Unlike the systems table, which may be easily modified by a wireless service provider, the system selection and acquisition logic, which controls when and how the systems are selected from the systems table, is difficult to modify. The system selection and acquisition logic of a conventional mobile device is hard-coded into the circuitry of a system determination unit. If the wireless services provider or mobile device manufacturer is not satisfied with the system selection and acquisition logic in preexisting system determination units, a proprietary system determination unit may be created. Configuring a system determination unit with unique program logic requires the generation of a corresponding software image, which must be tested and loaded into the new system determination unit. This process is expensive, hard to manage and time consuming. Further, even if desirable system selection and acquisition logic is initially selected for the mobile device, the wireless services provider may later desire to update the system selection and acquisition logic. Changing the system selection and acquisition logic will require replacing the current system determination unit with a new system determination unit that encapsulates the desired procedure, a process that is generally cost prohibitive, inconvenient to the user and, as a result, seldom performed in practice.

To accommodate the specific requirements of different mobile device manufacturers, wireless services providers and markets, there is a need in the art for an efficient and cost effective method and apparatus that allows manufacturers and wireless services providers to configure and modify the system selection and acquisition logic in a mobile device.

SUMMARY OF THE INVENTION

In a preferred embodiment of the present invention, a mobile station includes client circuitry for facilitating wireless communications with a wireless communications system, and a configurable system selection unit that executes a system selection and acquisition procedure. The configurable system selection unit includes a script engine adapted to execute an active script and a nonvolatile memory storing at least one script that defines the system selection and acquisition procedure. The system selection and acquisition procedure may be altered by modifying the contents of the nonvolatile memory.

In a preferred embodiment, the client circuitry controls the operation of the mobile station, including facilitating wireless communications with a wireless communications system, and the configurable system selection unit controls system selection and acquisition attempts. The client circuitry may be implemented using conventional circuit elements such as one or more processors, memories and application specific integrated circuits (ASICs) as known in the art.

The configurable system selection unit includes a front end, a systems database, and a system selection core. The front end provides an interface between the configurable system selection unit and the client circuitry. The systems database stores data describing known wireless communications systems that are used during system selection and acquisition attempts. The system selection core includes a script table for storing system selection and acquisition logic and a script engine adapted to process an active script.

In a preferred embodiment, the systems database includes a preferred roaming list (PRL), a most recently used systems list, a list of available systems, a list of systems that represent the geographic region of the current serving system, a list of systems that are more preferred than the current serving system, a list of systems that were included in the most recent service redirection message, a list of systems that are currently on a re-acquisition schedule and a systems information table that stores historical information on each of the systems that the configurable system selection unit has attempted to acquire.

The front end is preferably adapted to receive a system selection function call from the client circuitry and transmit a corresponding system selection event to the system selection core. When the system selection function call is received, the front end determines the type of the function call. The system selection function calls may include those function calls that are typically received by a system determination unit as known in the art, and preferably include user functions, CDMA functions, AMPS functions, HDR functions, GSM functions, WCDMA functions and miscellaneous system selection functions. If the received system selection function call has a type that is capable of being processed, the front end searches the function call for received data and, if found, updates the systems database. Next, the system selection function call is mapped to a corresponding system selection event. The front end transmits the system selection event to the system selection core, which processes the event. The front end is also adapted to receive a system selection action from the system selection core and transmit a corresponding system selection action to the client circuitry for execution.

When the system selection core receives an event from the front end, the system selection core searches for the received event in the script table. In a preferred embodiment, the script table includes a plurality of conditions and corresponding scripts. If a condition evaluates to TRUE, then the corresponding script becomes the active script, which is executed by the script engine. If none of conditions evaluate to TRUE, then the current active script remains in effect. The functionality for each of the script constructs is hardcoded into the script engine. The script engine accesses and updates the systems database in accordance with the active script and returns a system selection action to the front end for execution by the client circuitry.

The script table is preferably stored in a nonvolatile memory. The conditions and scripts stored therein define the system selection and acquisition procedures that are used by the mobile station. The script table, and consequently the system selection and acquisition procedures, may be modified by altering the stored data. In a preferred embodiment, updates to the script table are downloaded to the mobile station from an external source, such as the mobile station's wireless services provider, through an over-the-air transfer protocol. It is contemplated that, in alternative embodiments, the script table may be maintained by any entity and the script table may be updated using any data transfer methodology supported by the mobile station, such as data transfers across a serial or USB port using a service programming tool.

A more complete understanding of the Method and Apparatus for Configurable Selection and Acquisition of a Wireless Communications System will be afforded to those skilled in the art, as well as a realization of additional advantages and objects thereof, by a consideration of the following detailed description of preferred embodiments. Reference will be made to the appended sheets of drawings, which will first be described briefly.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 3 is a systems database in accordance with a preferred embodiment of the present invention;

FIG. 4a is a systems table in accordance with a preferred embodiment of the present invention;

FIG. 4b is an acquisition table in accordance with a preferred embodiment of the present invention;

DETAILED DESCRIPTION OF A PREFERRED EMBODIMENT

Figure 1:
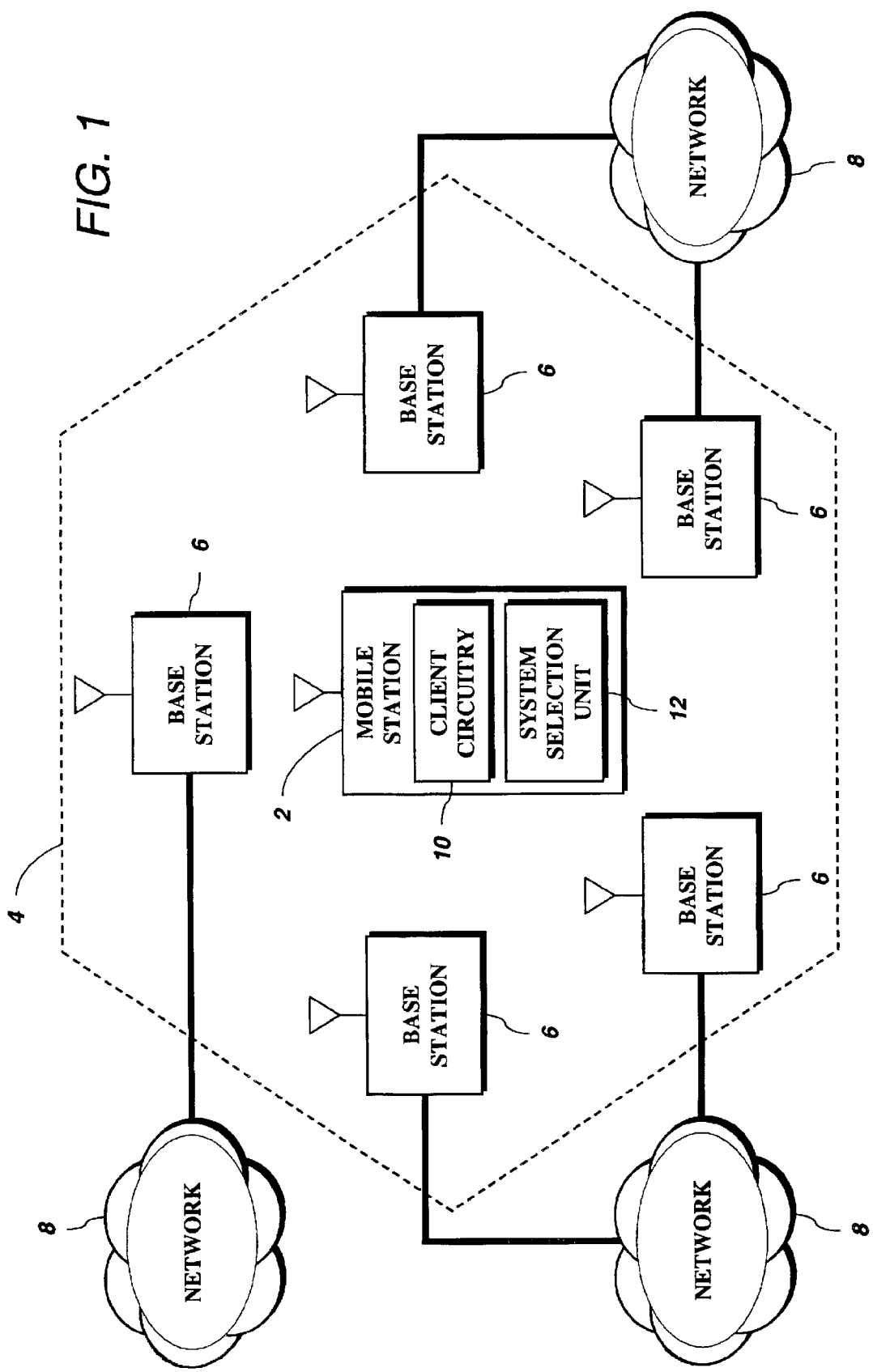
FIG. 1 illustrates an operating environment for a mobile station in accordance with a preferred embodiment of the present invention.

A preferred embodiment of the present invention will now be described with reference to FIG. 1. A mobile station 2 operates in a geographic region 4 that is serviced by at least one base station 6. Each base station 6 is connected to a network 8, which is part of a larger wireless communications system that supports at least one multiple-access wireless communications protocol, such as code division multiple access (CDMA), wideband CDMA (WCDMA), Advanced Mobile Phone Service (AMPS), Global System for Mobile communications (GSM), General Packet Radio Services (GPRS) or High Data Rate (HDR) technology (e.g., 1×EV technology). The mobile station 2 may be any wireless device, whether stationary or mobile, that is adapted for wireless communications with at least one base station 6, such as a cellular telephone, pager, personal digital assistant (PDA), vehicle navigation system or portable computer.

Figure 2:
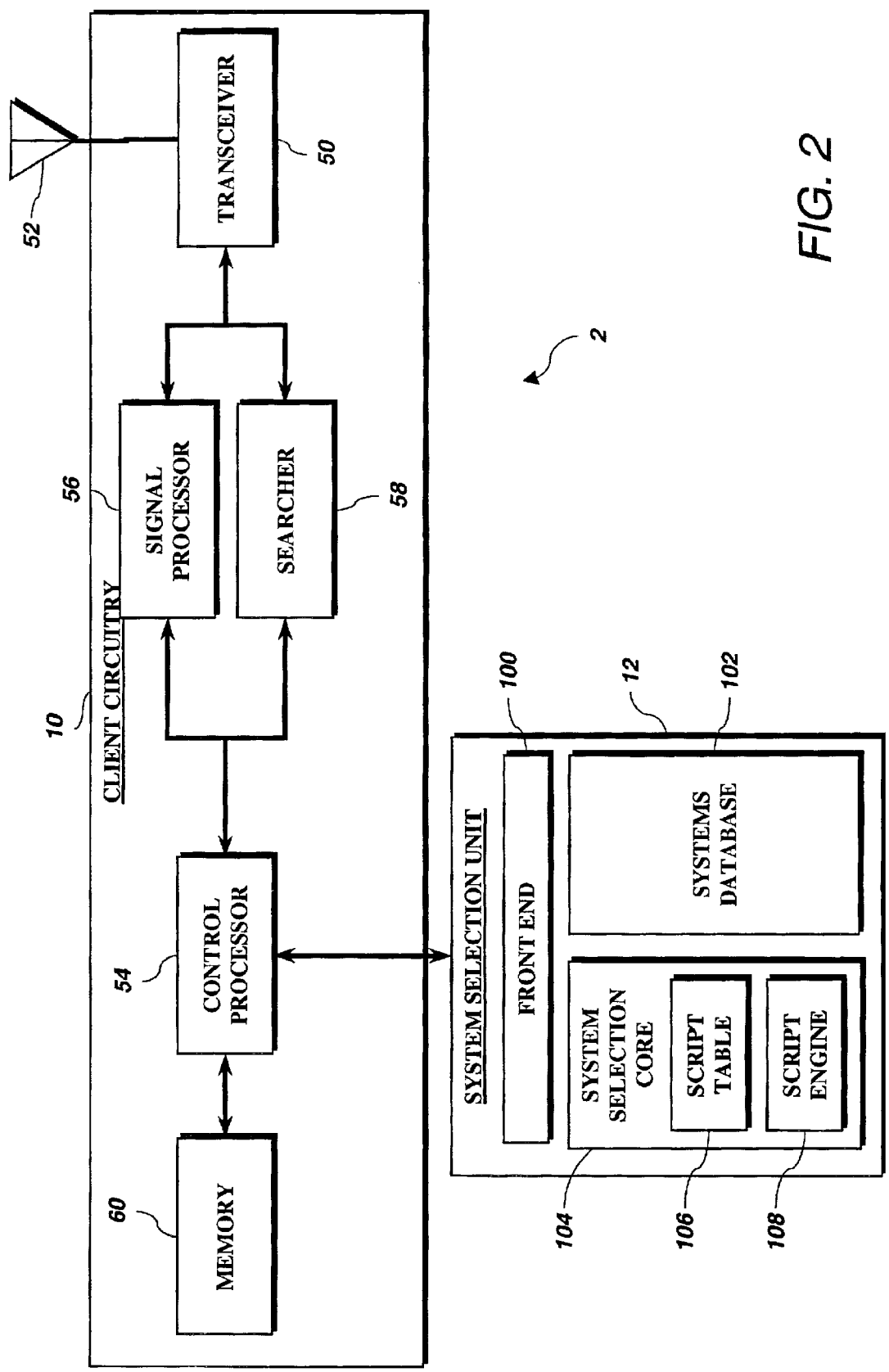
FIG. 2 illustrates the mobile station in accordance with a preferred embodiment of the present invention.

The mobile station 2 includes client circuitry 10 for controlling the operation of the mobile station 2, including facilitating wireless communications with a base station 6, and a configurable system selection unit 12 for controlling system selection and acquisition. Referring to FIG. 2, a preferred embodiment of the client circuitry 10 and configurable system selection unit 12 will now be described. The client circuitry 10 includes a communications transceiver 50 coupled to an antenna 52, a control processor 54, a signal processor 56, a searcher 58 and a memory 60. The communications transceiver 50 facilitates the reception and transmission of signals through the antenna 52. The control processor 54 controls the operation of the mobile station 2 in accordance with program logic stored in the memory 60, and is adapted to communicate with the configurable system selection unit 12 as described herein. The signal processor 56 is preferably adapted to process both digital and analog signals. The searcher 58 is adapted to identify valid signals, such as pilot signals, synchronization channels and paging channels received by the transceiver 50 through the antenna 52.

The components of the client circuitry 10 are well known in the art and may be implemented in numerous hardware configurations using conventional circuit elements such as one or more processors, memories and application specific integrated circuits (ASICs). For example, the design and implementation of hardware for CDMA acquisition is described in U.S. Pat. No. 5,109,390, entitled "DIVERSITY RECEIVER IN A CDMA CELLULAR TELEPHONE SYSTEM," assigned to the assignee of the present invention, and is incorporated herein by reference. It should be appreciated that the client circuitry 10 illustrated in FIG. 2 is merely illustrative and that alternative configurations and additional features are contemplated within the scope and spirit of the present invention. For example, it is contemplated that the client circuitry 10 and the mobile station 2 may be adapted for voice communications, high-speed data communications, video communications, internet applications such as email and World Wide Web access, position location (e.g., gpsOne™ developed by assignee), personal navigation, voice recognition, integrated removable storage devices and short-range wireless connectivity with local peripherals and devices. In a preferred embodiment, the client circuitry 10 includes a Mobile Station Modem chipset, developed by assignee, which integrates digital and analog functions along with GPS-based position location.

In a preferred embodiment, the configurable system selection unit 12 includes a front end 100, a systems database 102, and a system selection core 104. The front end 100 provides an interface between the configurable system selection unit 12 and the client circuitry 10, and is adapted to update the systems database 102 with information that is received in system selection function calls and map the received system selection function calls into system selection events that can be processed by the system selection core 104. The systems database 102 stores data describing known wireless communications systems that are used during system selection and acquisition. The stored data preferably includes both programmable knowledge (e.g., a PRL) and accumulated knowledge (e.g., an MRU) that is collected by the mobile station 2 during operation. The system selection core 104 is adapted to process system selection events received from the front end 100 and instruct the front end 100 of the next system selection action to be performed by the client circuitry (e.g., continue, acquire a system, or request a measurement report). The system selection core 104 includes at least one script table 106 for storing system selection and acquisition logic scripts and a script engine 108 for executing the stored scripts.

A preferred embodiment of the systems database 102 will now be described with reference to FIG. 3. The systems database 102 includes both volatile and nonvolatile random access memories that store a plurality of tables including a preferred roaming list (PRL) 110. Referring to FIGS. 4a and 4b, the PRL 110 preferably includes a systems table 120 and an acquisition table 122. As illustrated, each record in the systems table 120 includes a system identifier (SID) 120a, a network identifier (NID) 120b, an indication of whether the system is preferred or negative (P/N) 120c, an identifier of the geographic region (Region) 120d that is covered by the system, desirability information 120e and a pointer (AT Pointer) 120f to a record in the acquisition table 122. Each wireless communications system listed in the systems table 120 is identified through a unique SID 120a, NID 120b pair and is designated as either a preferred system that may be used by the mobile station 2 during roaming, or a negative system that should not be used by the mobile device 2 during roaming through P/N 120c. In alternative embodiments, the wireless communications systems listed in the systems table 120 may be identified using other system identifiers, such as a unique band, mode and frequency, an Internet Protocol Version 6 (IPV6) address or a Public Land Mobile Network (PLMN) identifier. The wireless communications systems are preferably grouped by geographic region 120d and stored in the systems table 120 in sorted order from the most desirable system to the least desirable system in each region using the desirability information 120e.

The acquisition table 122 includes a list of parameters that are necessary for the acquisition of the wireless communications systems listed in the systems table 120. As illustrated, each record in the acquisition table 122 preferably includes a mode 122a, a band 122b and a frequency 122c. The systems table 100 and the acquisition table 102 are preferably updated periodically by an external source, such as the mobile station's wireless service provider, through downloads across a wireless connection or through another data transfer method supported by the mobile station 2. It will be appreciated that alternative configurations for the PRL 110, the systems table 120 and the acquisition table 122, and alternative identification and acquisition parameters may be used in accordance with the present invention.

Referring back to FIG. 3, the preferred systems database 102 also includes a most recently used systems list (MRU) 112, a list of available systems 114, a list of systems that represent the geographic region of the current serving system 116, a list of systems that are more preferred than the current serving system 118, a list of systems that were included in the most recent service redirection message 120 and a list of systems that are currently on a reacquisition schedule 122.

The systems database 102 also includes a systems information table 124 that stores historical information on each of the systems that the configurable system selection unit 12 has attempted to acquire. The stored information preferably includes a system identifier, a PRL designation, a roaming status, an identifier of the last system selection event received for the system, the time the last system selection event was received, the last measurement of the received power or pilot strength and a schedule indicating when the system should be revisited for reacquisition attempts or should be avoided from any acquisition attempts. In a preferred embodiment, each system is defined as a unique set of mode, band and CDMA channel/AMPS system. In alternative embodiments other system identifiers may be used, including a unique SID, NID pair, an Internet Protocol Version 6 (IPV6) address or a Public Land Mobile Network (PLMN) identifier. During operation, the systems information table 124 is regularly updated as the configurable system selection unit 12 gathers information about the systems.

Figure 5:
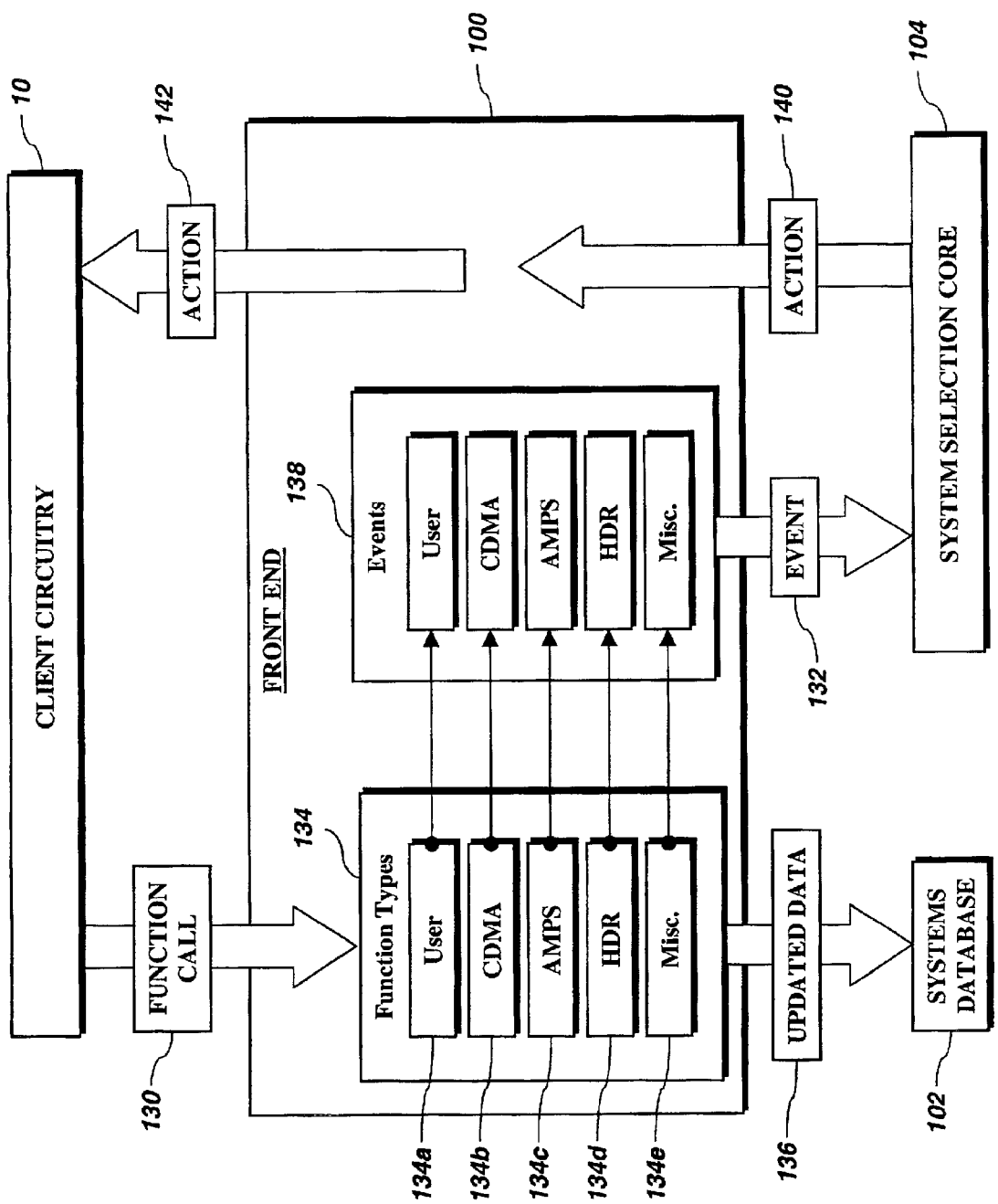
FIG. 5 illustrates a preferred operation of a front end in a configurable system selection unit.

A preferred operation of the front end 100 will now be described with reference to FIG. 5. The front end 100 is adapted to receive a system selection function call 130 from the client circuitry 10 and transmit a corresponding system selection event 132 to the system selection core 104. When the system selection function call 130 is received, the front end 100 determines the function call's type. The system selection function calls may include the same function calls that are typically received by a system determination unit as known in the art. In a preferred embodiment, the system selection function calls include user functions 134a, CDMA functions 134b, AMPS functions 134c, HDR functions 134d and miscellaneous system selection functions 134e. User functions 134a are received as a result of user actions, such as commands to power-up the mobile station 2, enter an offline CDMA mode, enter an offline AMPS mode, exit a power-save mode of operation, change system selection preferences, and power-down the mobile station 2.

CDMA functions 134b are specific to the CDMA mode of operation and include CDMA acquisition and operation functions. CDMA acquisition functions may include indications that a CDMA acquisition failed during the pilot channel acquisition or sync channel acquisition substates, an indication that a CDMA acquisition failed due to protocol mismatch and an indication that the CDMA sync channel message was successfully received and the protocol revision is compatible. CDMA operation functions may include an indication that registration has been rejected, the acquired system was lost, a redirection to CDMA was received, a redirection to AMPS was received, the client 10 has accepted/rejected a redirection, the measured pilot power is below a certain threshold, an access attempt has been terminated (e.g., due to access denied, system lost, max access probes, etc.) and other CDMA functions. In the preferred embodiment, the CDMA functions 134b will only be processed when the client circuitry 10 is operating in CDMA mode.

AMPS functions 134c are specific to the AMPS mode of operation and include AMPS acquisition functions and AMPS operation functions, such as AMPS rescan and AMPS base station overload. In a preferred embodiment, the AMPS functions 134c will only be processed when the client circuitry 10 is operating in AMPS mode.

HDR functions 134d are specific to the HDR mode of operation and include functions such as HDR redirection and HDR session close error. In the preferred embodiment, the HDR functions 134d will only be processed when the client circuitry 10 is operating in HDR mode.

Miscellaneous functions 134e include other functions such as system selection timer expiration and an indication that the mobile station entered a power save mode of operation.

It should be appreciated that the functional calls listed above are merely illustrative and that the actual set of functional calls 134 supported by the client circuitry 10 and the front end 100 will depend on the specific implementation of the mobile station 2.

If the received system selection function call 130 has a type that is capable of being processed, the front end 100 searches the function call 130 for received data and, if found, updates the systems database 102 with the updated data 136. Next, the system selection function call 130 is mapped to a corresponding event 132 that may be processed by the system selection core 104. The front end 100 transmits the system selection event 132 to the system selection core 104, which processes the event 132. The front end 100 is also adapted to receive a system selection action 140 from the system selection core 104 and transmit a corresponding system selection action 142 to the client circuitry 10. System selection actions 142 may include instructions to the client circuitry 10 to continue with a current mode of operation, acquire a CDMA system, acquire an AMPS system, acquire an HDR system, request a dedicated mode channel strength measurement from the searcher 58, request a background mode channel strength measurement from the searcher 58, enter a power-save mode of operation, accept a base station's proposed mode, band and CDMA channel/AMPS system, release a call and other actions to be executed by the client circuitry 10.

Figure 6:
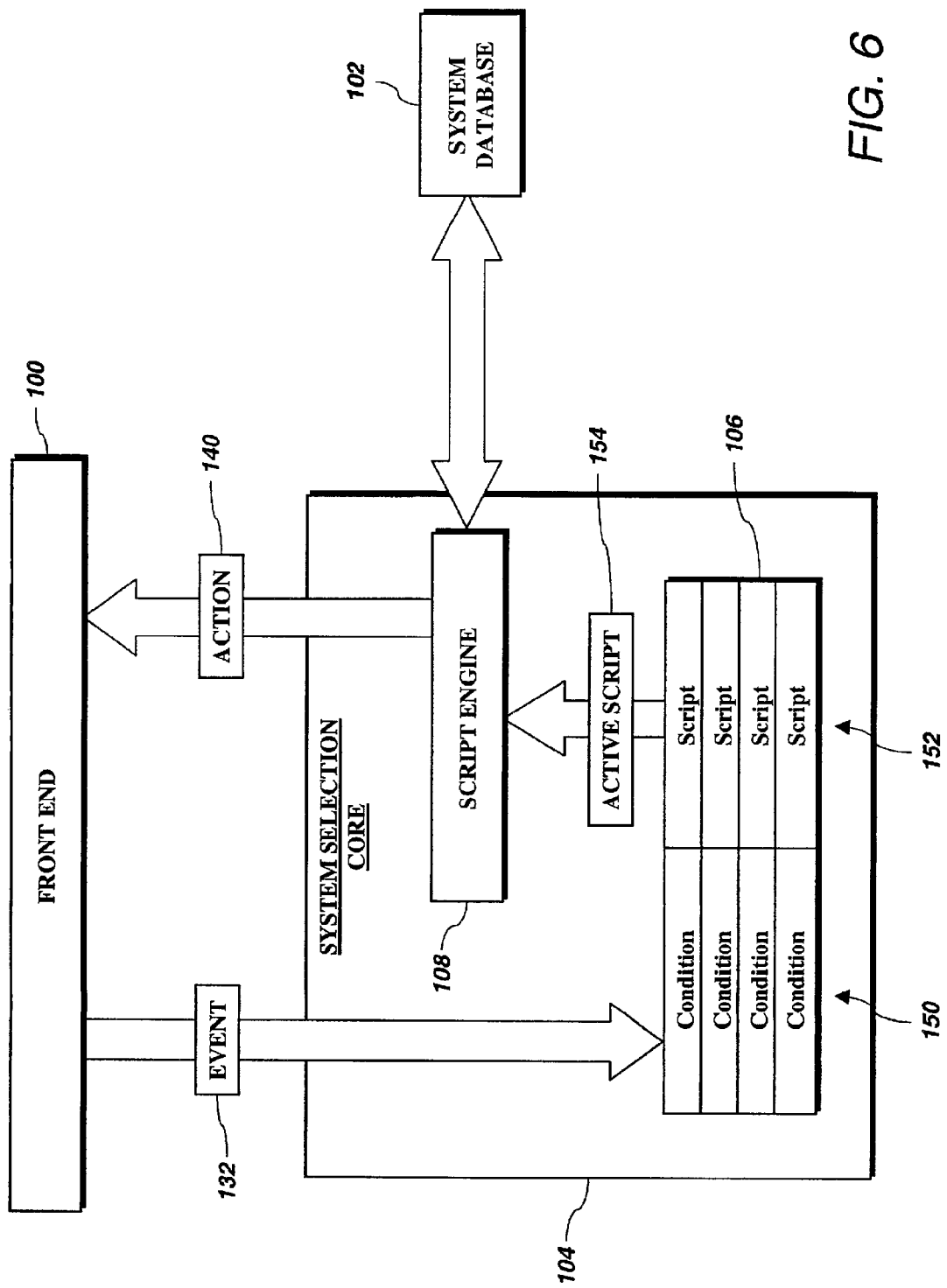
FIG. 6 illustrates a preferred operation of a system selection core in a configurable system selection unit.

A preferred operation of the system selection core 104 will now be described with reference to FIG. 6. When the system selection core 104 receives the event 132 from the front end 100, the system selection core 104 searches for the received event 132 in the script table 106. In a preferred embodiment, the script table 106 includes a plurality of conditions 150 and corresponding scripts 152. The script table 106 is searched (e.g., from top to bottom) until a condition 150 evaluates to TRUE. For example, the condition may identify a script to be performed if a certain user event is received (e.g., Is the event a user-power up?). If a condition evaluates to TRUE, then the corresponding script 152 becomes the active script 154, which is executed by the script engine 108. If none of conditions 150 evaluate to TRUE, then the current active script 154 remains in effect. In an alternative embodiment, system selection scripts are grouped into a plurality of script tables, each storing scripts associated with a different type of event. When an event is received, the system selection core 104 determines the type of event and searches for the received event in the appropriate script table. Script tables types may include CDMA acquisition, CDMA operation, AMPS acquisition, AMPS operation, HDR acquisition, HDR operation and miscellaneous tables. Other contemplated script table types include internal events scripts that associate scripts with internal system selection core 104 events and called scripts that associate scripts with the activation of other scripts. The script engine 108 accesses and updates the systems database 102 and returns a system selection action 140 to the front end 100, as required by the active script 154.

The script table 106 is preferably stored in a nonvolatile memory. The conditions 150 and scripts 152 stored therein define the system selection and acquisition procedures that are used by the mobile station 2. The script table 106, and consequently the system selection and acquisition procedures, may be modified by changing the stored data. The script table 106 may be updated using any data transfer methodology supported by the mobile device 2. In a preferred embodiment, updates to the script table 106 are downloaded to the mobile station 2 from an external source, such as the mobile device's wireless services provider, in the same manner that updates to the PRL are provided to the mobile station 2 (e.g., over the air using data-burst messages or other over-the-air transport method). In an alternative embodiment, the scripts (or a subset of the scripts) are represented as hard-coded tables that are compiled and downloaded into the mobile station with other software.

The scripts 152 may use any format, scripting language and syntax that is understood by the script engine 108. Each script 152 includes at least one script command, the functionality of which is preferably hard-coded into the script engine 108. The scripts 152 may be created to control any aspect of the system selection and acquisition process, including the order of system acquisition attempts, the acquisition type to be performed, the mode of the acquisition attempts, received power/pilot strength measurements, scheduling of re-acquisitions and avoidance of systems. In a preferred embodiment, the script commands are implemented using C macros and may include a command to sort a list of systems according to a sort category (e.g., strongest received power measurement or CDMA systems before other systems), a command to obtain a channel strength measurement for all of the systems in an identified list, commands to step through an identified list of systems and attempt to acquire the listed systems that meet certain criteria (e.g., Rx-power measurement greater than a threshold value) and a command to instruct the client circuitry to enter a power-save mode.

Figure 7:
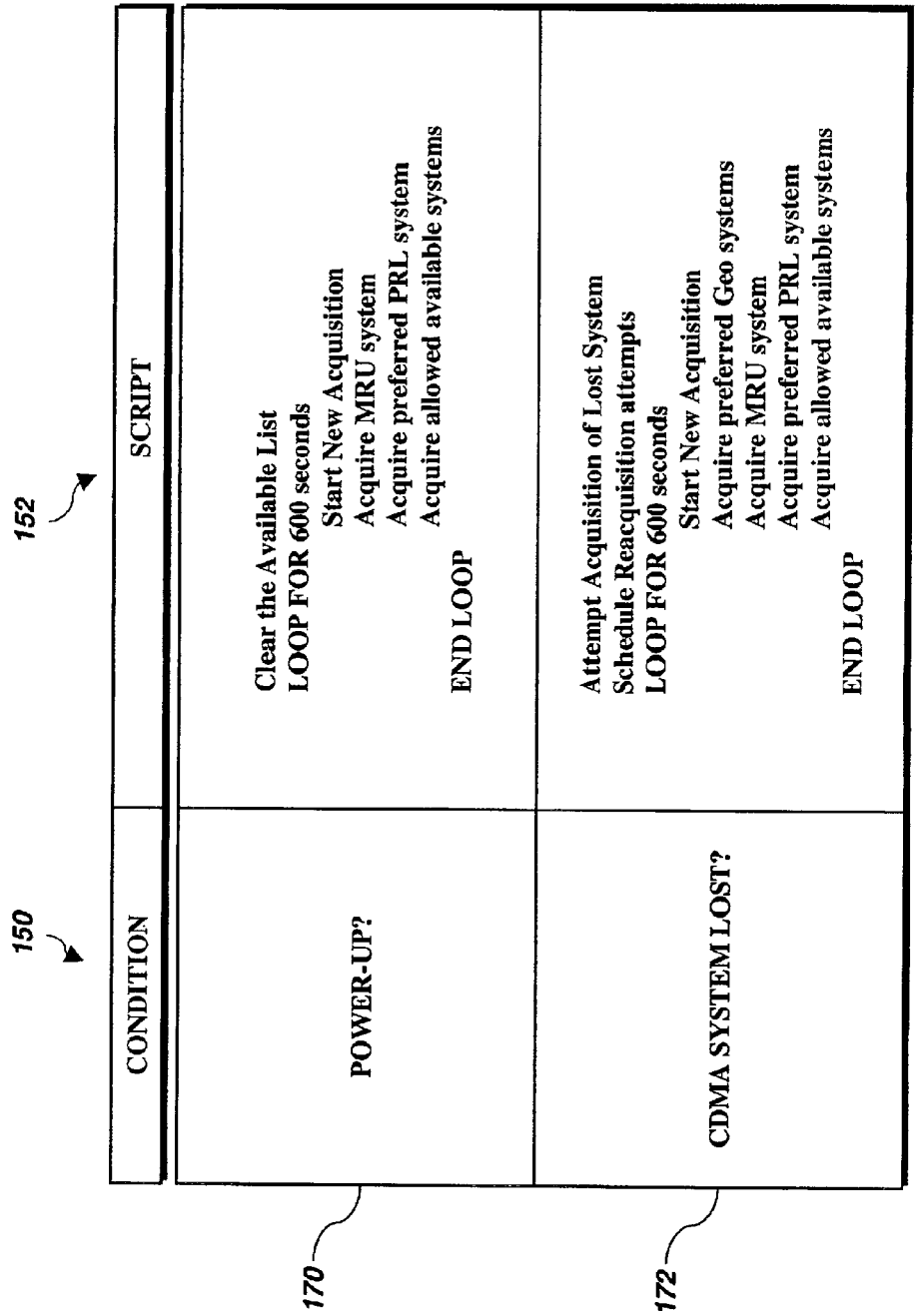
FIG. 7 provides an example of script table entries.

Two script examples are illustrated in FIG. 7. Entry 170 includes a script that is executed when a power-up sequence is detected. First, the available systems list is cleared and then an attempt is made to acquire an MRU system, followed by a preferred PRL system and finally an allowed available system from the available systems list. These acquisition attempts repeat for 600 seconds or until a system acquisition attempt is successful. Entry 172 includes a script that is executed when a CDMA system is lost. First, an attempt is made to reacquire the lost CDMA system and if the attempted acquisition fails, future reacquisition attempts are rescheduled. An attempt is then made to acquire a system from the GEO list, followed by the MRU list, the PRL list and finally an allowed available system from the available systems list. These acquisition attempts repeat for 600 seconds or until a system acquisition attempt is successful.

Having thus described a preferred embodiment of the Method and Apparatus for Configurable Selection and Acquisition of a Wireless Communications System, it should be apparent to those skilled in the art that certain advantages of the within described system have been achieved. It should also be appreciated that various modifications, adaptations, and alternative embodiments thereof may be made within the scope and spirit of the present invention.

The scope of the present invention is defined by the following claims.

What is claimed:

1. A mobile station comprising:
   client circuitiy adapted to facilitate wireless communications; and
   a configurable system selection unit including:
      a front end coupled to the client circuitry, the front end facilitating communications between the configurable system selection unit and the client circuitry, said client circuitry being further adapted to transmit system selection function calls to the front end; and
      a system selection core coupled to the front end, the system selection core including a script engine and a memory storing a least one script table, the script table including a plurality of system selection event conditions and corresponding scripts that define a system selection and acquisition procedure, wherein the front end is adapted to convert the received system function call to a system selection event and transmit the system selection event to the system selection core, the system selection event having a corresponding detectable event condition;
      wherein the script engine is adapted to detect an event condition and execute the corresponding script.

2. The mobile station of claim 1 further comprising a systems database, and wherein at least one system selection function call includes a data parameter and wherein the front end is adapted to update the system database with data received through system selection function calls.

3. The mobile station of claim 2 wherein the systems database includes a preferred roaming list.

4. The mobile station of claim 2 wherein at least one script generates a system selection action when executed, the system selection action providing an instruction to the client circuitry.

5. The mobile station of claim 1 wherein the configurable system selection unit is adapted to receive a system selection script and store the received script in the script table, thereby altering the system selection and acquisition procedure.

6. In a wireless device having client circuitry for controlling the operation of the wireless device and facilitating wireless communications with a wireless communications system, a configurable system selection unit comprising:
   a system selection core including a script engine and a random access memory storing at least one script table, the script table including a plurality of system selection event conditions and corresponding scripts that define a system selection and acquisition procedure, the random access memory storing a system database including a list of wireless communications systems;
   a front end coupled to the client circuitry and adapted to receive system selection function calls from the client circuitry, the front end facilitating communication between the system selection core and the client circuitry and being adapted to convert the received system function call to a system selection event and transmit the system selection event to the system selection core;
   wherein the script engine is adapted to detect a system selection event condition and execute the corresponding script,
   wherein the system selection core is adapted to receive a system selection script and store the received script in the script table, thereby altering the system selection and acquisition procedure and
   wherein at least one system selection function call includes a data parameter and the front end is adapted to update the system database with the received data.

7. The configurable system selection unit of claim 6 wherein at least one script generates a system selection action when executed, the system selection action providing an instruction to the client circuitry.

* * * * *